United States Patent
Yu et al.

(10) Patent No.: US 8,774,222 B2
(45) Date of Patent: Jul. 8, 2014

(54) METHOD FOR GENERATING AND TRANSMITTING FRAME IN A WIRELESS LOCAL AREA NETWORK AND APPARATUS FOR SUPPORTING THE SAME

(75) Inventors: Heejung Yu, Daejeon-si (KR); Il Gu Lee, Seoul (KR); Min Ho Cheong, Daejeon-si (KR); Hun Sik Kang, Daejeon-si (KR); Sok Kyu Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 13/370,573

(22) Filed: Feb. 10, 2012

(65) Prior Publication Data

US 2012/0207140 A1    Aug. 16, 2012

(30) Foreign Application Priority Data

Feb. 10, 2011  (KR) .................. 10-2011-0012039
Jan. 30, 2012  (KR) .................. 10-2012-0008875

(51) Int. Cl.
*H04J 3/24*    (2006.01)
(52) U.S. Cl.
USPC .......................................... 370/474; 370/338
(58) Field of Classification Search
CPC ......... H04B 10/516; H04J 11/00; H04L 5/00; H04L 1/0026; H04L 1/0027; H04L 27/2605; H04L 27/2613; H04L 27/2634; H04W 56/00; H04W 74/12

USPC .......................... 370/474, 338, 349, 350, 208
See application file for complete search history.

(56) References Cited

U.S. PATENT DOCUMENTS

| | | | |
|---|---|---|---|
| 7,839,760 B2 | 11/2010 | Yu et al. | |
| 2004/0165683 A1* | 8/2004 | Gupta et al. | 375/340 |
| 2005/0233709 A1* | 10/2005 | Gardner et al. | 455/101 |
| 2009/0190686 A1* | 7/2009 | Cheong et al. | 375/267 |
| 2009/0285185 A1* | 11/2009 | Hansen et al. | 370/334 |
| 2011/0051747 A1* | 3/2011 | Schmidl et al. | 370/474 |
| 2012/0263158 A1* | 10/2012 | Lee et al. | 370/338 |

FOREIGN PATENT DOCUMENTS

| | | |
|---|---|---|
| KR | 1020070058045 A | 6/2007 |
| KR | 1020090097543 A | 9/2009 |

* cited by examiner

*Primary Examiner* — Gary Mui

(57) ABSTRACT

A channel sounding method in a wireless local area network (WLAN) system is provided. The method, performed by a transmitter, includes transmitting a null data packet announcement (NDPA) frame to a receiver to initiate a channel sounding procedure; transmitting a null data packet (NDP) to the receiver and receiving a feedback frame. The feedback frame includes a plurality of segment frames and a channel feedback report. The channel feedback report is split into a plurality of feedback segments. Each of the plurality of feedback segments is respectively included in each of the plurality of segment frames. The each of the plurality of segment frames includes a first-segment subfield indicating whether the each of the plurality of feedback segment included is a first segment and a remaining-segment subfield indicating the number of remaining feedback segments.

25 Claims, 12 Drawing Sheets

Figure. 4

(a) CP | 1st OFDM symbol | CP | 2nd OFDM symbol | CP | 3rd OFDM symbol | CP | 4th OFDM symbol (b) CP | 1st OFDM symbol | CP | 2nd OFDM symbol | CP | 3rd OFDM symbol | 4th OFDM symbol (c) Double length CP | 1st OFDM symbol | 2nd OFDM symbol | Double length CP | 3rd OFDM symbol | 4th OFDM symbol

Figure. 8

| Non-repetition | | | Cyclic OFDM symbol repetition | | |
|---|---|---|---|---|---|
| Mapping | Code rate | R1-R4 | Mapping | Code rate | R1-R4 |
| BPSK | 1/2 | 1101 | BPSK | 1/2 | 1100 |
| BPSK | 3/4 | 1111 | BPSK | 3/4 | 1110 |
| QPSK | 1/2 | 0101 | QPSK | 1/2 | 0100 |
| QPSK | 3/4 | 0111 | QPSK | 3/4 | 0110 |
| 16QAM | 1/2 | 1001 | 16QAM | 1/2 | 1000 |
| 16QAM | 3/4 | 1011 | 16QAM | 3/4 | 1010 |
| 64QAM | 2/3 | 0001 | 64QAM | 2/3 | 0000 |
| 64QAM | 3/4 | 0011 | 64QAM | 3/4 | 0010 |

Figure. 9
(a) 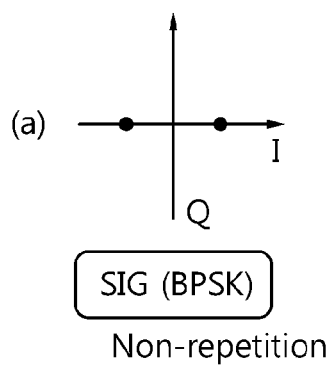
Non-repetition
(b) 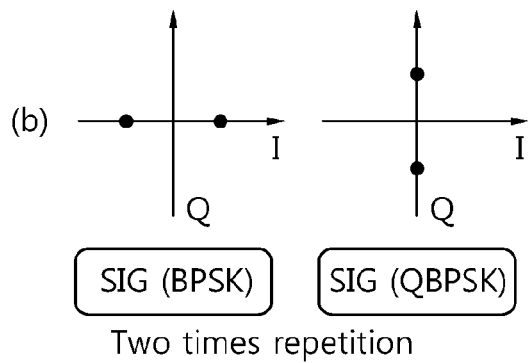
Two times repetition
(c) 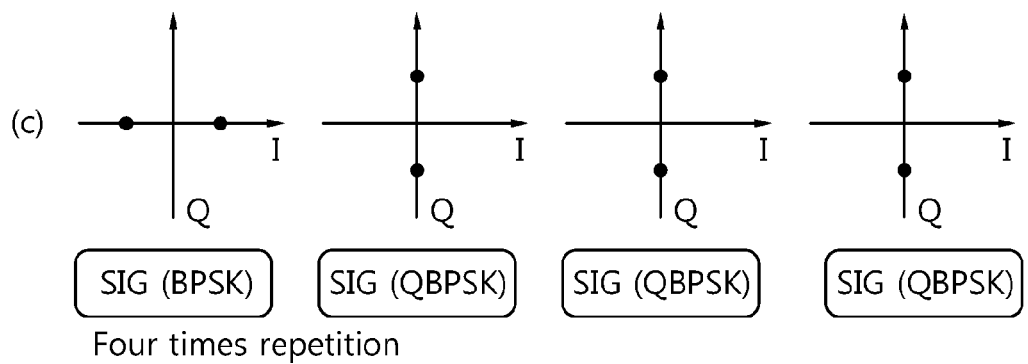
Four times repetition

METHOD FOR GENERATING AND TRANSMITTING FRAME IN A WIRELESS LOCAL AREA NETWORK AND APPARATUS FOR SUPPORTING THE SAME

CROSS-REFERENCE TO RELATED APPLICATIONS

This application claims the benefit of Korean Patent Application No. 10-2011-0012039 filed on Feb. 10, 2011, and Korean Patent Application No. 10-2012-0008875 filed on Jan. 30, 2012, all of which are incorporated by reference in their entirety herein.

BACKGROUND

1. Technical Field

The present invention relates to wireless communication, and more particularly, to a method for generating and transmitting a frame for extending service coverage in a wireless local area network and an apparatus for supporting the same.

2. Related Art

Recently, various wireless communication technologies are being developed with the development with advancement of information communication technologies. Among others, a WLAN is a technology of wirelessly accessing the Internet in home, business, or specific service providing areas by using mobile terminals such as a personal digital assistant (PDA), a lap top computer, a portable multimedia player (PMP), or the like, based on a wireless frequency technology.

The WLAN technology has been focused as a wireless communication technology providing a fast data service in an unlicensed band. In particular, unlike the existing cellular communication system, an access point serving as a base station can be easily installed by anybody when it is supplied with power and is connected with a wired network and it is an inexpensive means to implement data communication. As a result, the access point has been prevalently used.

One of the characteristics of the WLAN allows a decentralized operation which simplifies operations and thus, has been prevalently used for a sensor network and a smart utility network. In the case of the sensor network and the smart utility network, traffic to be transmitted is not large and a transmission period is short. Therefore, the extension of service coverage is more important than the improvement of a transmission rate in the WLAN system.

Therefore, a method of repeated transmission for extending athe coverage of the WLAN system and a method for generating a frame having a structure capable of supporting the same.

SUMMARY

The present invention provides a method for generating and transmitting a frame for extending service coverage in a wireless local area network and an apparatus for supporting the same.

In an aspect, a method for transmitting a frame by a transmit station (STA) in a wireless local area network system is provided. The method includes transmitting a short training symbol for coarse frequency offset estimation and timing synchronization to a receive STA; transmitting a long training symbol for fine frequency offset estimation and channel estimation to the receive STA; transmitting a first signal symbol including control information to the receive STA; transmitting a second signal symbol including the control information to the receive STA; transmitting a first data symbol to the receive STA; and transmitting a second data symbol to the receive STA.

The first signal symbol and the second signal symbol may be an orthogonal frequency division multiplexing symbol.

The second signal symbol may be a cyclic OFDM repeat symbol including subcarriers in which a position of the subcarriers of the first signal symbol is disposed to be changed based on subcarrier index 0.

The second data symbol may be a cyclic OFDM repeat symbol including subcarrier in which a position of the subcarriers of the first data symbol is disposed to be changed based on subcarrier index 0.

The first signal symbol may be applied with binary phase shift keying (BPSK) modulation.

The second signal symbol may be applied with quadrature binary phase shift keying (QBPSK) modulation.

The control information may include information indicating that the first signal symbol and the second signal symbol in which the first signal symbol is cyclically OFDM repeated are transmitted.

The method may further include transmitting a third signal symbol, the third signal symbol being same as the first signal symbol; and transmitting a fourth signal symbol, the fourth signal symbol being same as the second signal symbol.

The method may further include transmitting a third data symbol, the third data symbol being same as the first data symbol; and transmitting a fourth data symbol, the fourth data symbol being same as the second data symbol.

The third signal symbol may be transmitted between the first signal symbol and the second signal symbol.

The fourth signal symbol may be transmitted following the second signal symbol.

The first signal symbol may be applied with BPSK modulation.

The second signal symbol, the third signal symbol, and the fourth signal symbol may be applied with QBPSK modulation.

The control information may include information indicating that the first signal symbol, the second signal symbol, the third signal symbol, and the fourth signal symbol are transmitted.

The method may further includes transmitting a plurality of cyclic prefix (CP) for protecting each symbol from a delay spread.

Each cyclic prefix may be prepeded to the first signal symbol, the second signal symbol, the first data symbol and the second data symbol.

The each cyclic prefix may further be prepeded to the third signal symbol, the fourth signal symbol, the third data symbol and the fourth data symbol.

Length of the short training symbol may be extended for improving the coarse frequency offset estimation and the timing synchronization.

Length of the long training symbol may be extended for improving the fine frequency offset estimation and the channel estimation.

In an another aspect, a wireless device is provided. The wireless device includes a transceiver transmitting and receiving a wireless signal; and a processor operated to be functionally coupled with the transceiver. The processor is configured to transmit a short training symbol for coarse frequency offset estimation and timing synchronization to a receive device; transmits a long training symbol for fine frequency offset estimation and channel estimation to the receive device; transmits a first signal symbol including control information to the receive device; transmits a second signal symbol including the control information to the receive device; transmits a first data symbol to the receive device; and transmits a second data symbol to the receive device.

The first signal symbol and the second signal symbol may be an orthogonal frequency division multiplexing symbol.

The second signal symbol may be a cyclic OFDM repeat symbol including subcarriers in which a position of the subcarriers of the first signal symbol is disposed to be changed based on subcarrier index 0.

In still another aspect, a method for receiving a frame by a receive station (STA) in a wireless system, is provided. The method includes receiving a short training symbol for coarse frequency offset estimation and timing synchronization from a transmit STA; receiving a long training symbol for fine frequency offset estimation and channel estimation from the transmit STA; receiving a first signal symbol including control information from the transmit STA; receiving a second signal symbol including the control information from the transmit STA; receiving a first data symbol from the transmit STA; and receiving a second data symbol from the transmit STA.

The first signal symbol and the second signal symbol may be an orthogonal frequency division multiplexing symbol.

The second signal symbol may be a cyclic OFDM repeat symbol including subcarriers in which a position of the subcarriers of the first signal symbol is disposed to be changed based on subcarrier index 0.

BRIEF DESCRIPTION OF THE DRAWINGS

FIG. 4 is a block diagram showing a frame format that may be applied to the repeat transmission according to the exemplary embodiment of the present invention.

FIG. 8 is a diagram showing a configuration of a rate subfield according to the exemplary embodiment of the present invention.

FIG. 9 is a diagram showing a constellation mapping method applied to the signal field according to the exemplary embodiment of the present invention.

DESCRIPTION OF EXEMPLARY EMBODIMENTS

Figure 1:
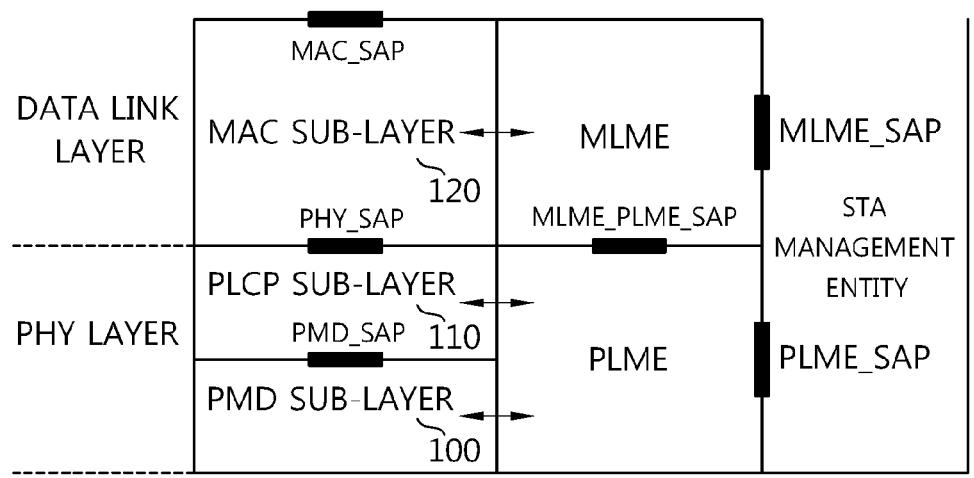
FIG. 1 is a diagram showing a physical layer architecture of a WLAN system supported by IEEE 802.11.

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification.

Throughout the present specification, unless explicitly described to the contrary, "comprising" any components will be understood to imply the inclusion of other elements rather than the exclusion of any other elements. A term "part", "module", "unit", or the like, described in the specification means a unit of processing at least one function or operation and may be implemented by hardware or software or a combination of hardware and software.

A wireless local area network (WLAN) system to which an exemplary embodiment of the present invention may be applied includes one or more basic service set (BSS). The BSS is a set of STAs that may be successfully synchronized to communicate with each other and thus, is not a concept restricted to a specific region.

The STA includes a medium access control (MAC) according to IEEE (Institute of Electrical and Electronics Engineers) 802.11 standard and includes both of the AP and non-AP station, in a broad sense, as any function medium including a physical layer interface for a wireless medium.

The non-AP STA is an STA, not AP. The non-AP STA may be referred to as other names, such as a mobile terminal, a wireless device, a wireless transmit/receive unit (WTRU), user equipment (UE), a mobile station (MS), a mobile subscriber unit, simply, user, or the like. Hereinafter, for convenience of explanation, the non-AP STA is referred to as STA.

The AP is a functional entity that provides an access to DS via a wireless medium for associating an STA with the corresponding AP. In the infrastructure BSS including the AP, communication among the STAs may be basically performed via the AP, but may be directly performed among the STAs when a direct link is established. The AP may also be referred to as a central controller, a base station (BS), a node-B, a base transceiver system (BTS), or a site controller, or the like.

FIG. 1 is a diagram showing a physical layer architecture of a WLAN system supported by IEEE 802.11.

The physical layer (PHY) architecture of the IEEE 802.11 includes a PHY layer management entity (PLME), that is, a physical layer convergence procedure (PLCP) sub-layer 110, and a physical medium dependent (PMD) sub-layer 100. The PLME cooperates with MAC layer management entity (MLME) to provide a management function of the physical layer. The PLCP sub-layer 110 transfers an MAC protocol data unit (MPDU) received from the MAC sub-layer 120 to the PMD sub-layer 100 or transfers a frame coming from the PMD sub-layer 100 to the MAC sub-layer 120 according to instruction of the MAC layer, between the MAC sub-layer 120 and the PMD sub-layer 100. The PMD sub-layer 100, which is a lower layer of the PLCP, may transmit and receives the PHY entity between two STAs through a wireless medium. The MPDU transmitted from the MAC sub-layer 120 is called a physical service data unit (PSDU) in the PLCP sub-layer 110. The MPDU is similar to the PSDU. However, when an aggregated MPDU (A-MPDU) in which a plurality of MPDUs are aggregated is transferred, individual MPDUs and PSDUs may be different from each other.

The PLCP sub-layer 110 adds an additional field including information required by a physical layer transceiver to the PSDU during a process of receiving the PSDU from the MAC sub-layer 120 and transferring the PSDU to the PMD sub-layer 100. In this case, the added field may be tail bits, or the like, required to return a PLCP preamble, a PLCP header, and a convolution encoder in the PSDU to a zero state. The PLCP sub-layer 110 receives a TXVECTOR parameter including control information required to generate and transmit PPDU and control information required to allow the receive STA to receive and analyze the PPDU from the MAC sub-layer. The PLCP sub-layer 110 uses information included in the TXVECTOR parameter to generate the PPDU including the PSDU.

The PLCP preamble serves to allow a receiver to prepare a synchronization function and antenna diversity before the PSDU is transmitted. The data field may include a coded sequence which is a sequence including a PSDU and padding bits, a service field including a bit sequence for initializing a scrambler, and tail bits, all of which are appended to the PSDU.

The PLCP preamble functions to enable a receiver to be prepared for a synchronization function and an antenna diversity before the PSDU is transmitted. A data field may include padding bits, a service field including a bit sequence for resetting a scrambler, and a coded sequence in which the bit sequence having tail bits added thereto has been encoded in the PSDU. Here, an encoding scheme may be either a Binary Convolutional Coding (BCC) encoding scheme or a Low Density Parity Check (LDPC) encoding scheme according to an encoding scheme supported by an STA that receives a PPDU. The PLCP header includes a field including information about a PLCP Protocol Data Unit (PPDU) to be transmitted.

In the PLCP sub-layer 110, the PLCP protocol data unit is generated by adding the above-mentioned field to the PSDU and is transmitted to the receive station via the PMD sub-layer and the receive station receives the PPDU to obtain and restores information required for data restoration from the PLCP preamble and the PLCP header. The PLCP sub-layer of the receive station may transmit the RXVECTOR parameter including the control information included in the PLCP preamble and the PLCP header to the MAC sub-layer to analyze the PPDU in a receive state and obtain data.

Most of the transmission protocols of the WLAN system have been developed in a direction for improving the transmission rate. The improvement in transmission rate may be implemented by multiple input multiple output (MIMO) that is a multiple antenna transmitting and receiving method and bandwidth extension.

In the general network environment, the improvement in transmission rate as described above may have importance in connection with the increase in network capacity. However, in the network for collecting information like the sensor network, the extension of the coverage may have the greater importance. The extension of the coverage means collecting the information in the wide region through a smaller number of APs, which results in building the sensor network at a low cost.

The extension of the coverage of the WLAN system has connection with the transmission power used at the time of the transmission of the wireless signal and the receive sensitivity at a receiver side. When transmitting the wireless signal by increasing the transmission power, the wireless signals may be transmitted with further distance therebetween. However, the transmission power is limited by the communication protocol and therefore, may not be increased for the coverage extension without being limited. In addition, in the sensor network, the wireless communication entity may have an inexpensive, small wireless device and therefore, may have the limited transmission power capable of being used in the corresponding wireless device.

Therefore, in the exemplary embodiment of the present invention, the extension of the coverage of the WLAN can be implemented by a method for improving the receive sensitivity at the receiver side to more accurately receive the wireless signal. To this end, the exemplary embodiment of the present invention proposes a method for repeating and transmitting an orthogonal frequency division multiplexing symbol that is the wireless signal and a frame format applied to the corresponding method. Hereinafter, this will be described in more detail with reference to the following drawings.

Figure 2:
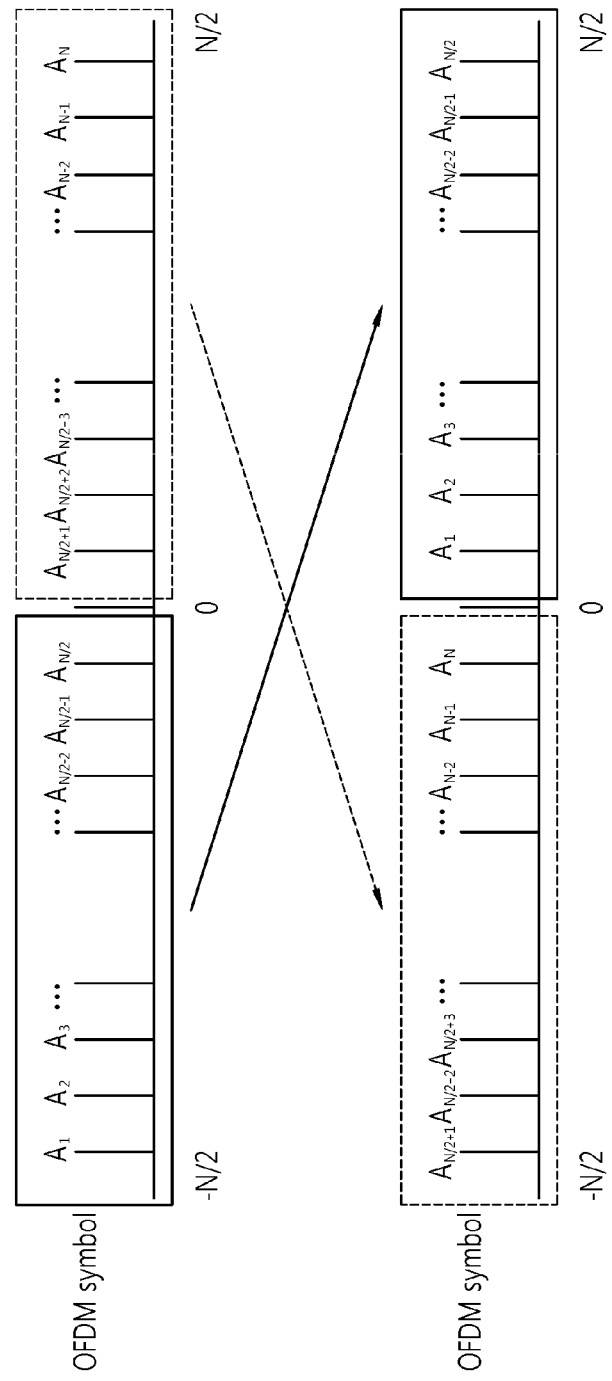
FIG. 2 is a diagram showing cyclic OFDM symbol repetition.

FIG. 2 is a diagram showing cyclic OFDM symbol repetition.

Referring to FIG. 2, one OFDM symbol include N data subcarriers. The N subcarriers are divided into DC component, that is, two groups based on subcarrier index 0. Therefore, one subcarrier group of the subcarriers divided into two groups has a positive index value and the remaining one group has a negative index value.

The cyclic OFDM symbol repetition first transmits the OFDM symbol in which the position of the subcarrier group included in the OFDM symbol to be first transmitted is changed. In FIG. 2, in the upper OFDM symbol to be first transmitted, the subcarriers of $A_1$ to $A_{N/2}$ corresponds to a subcarrier group having a negative index and the subcarriers of $A_{N/2+1}$ to $A_N$ corresponds to a subcarrier group having a positive index. Meanwhile, it can be appreciated that the position of the subcarriers within the lower OFDM symbol to be following transmitted is reverse.

The above-mentioned cyclic OFDM symbol repetition is to obtain a frequency diversity gain. The cyclic OFDM symbol repetition as shown in FIG. 2 may be easily applied for transmission repeated two times.

Figure 3:
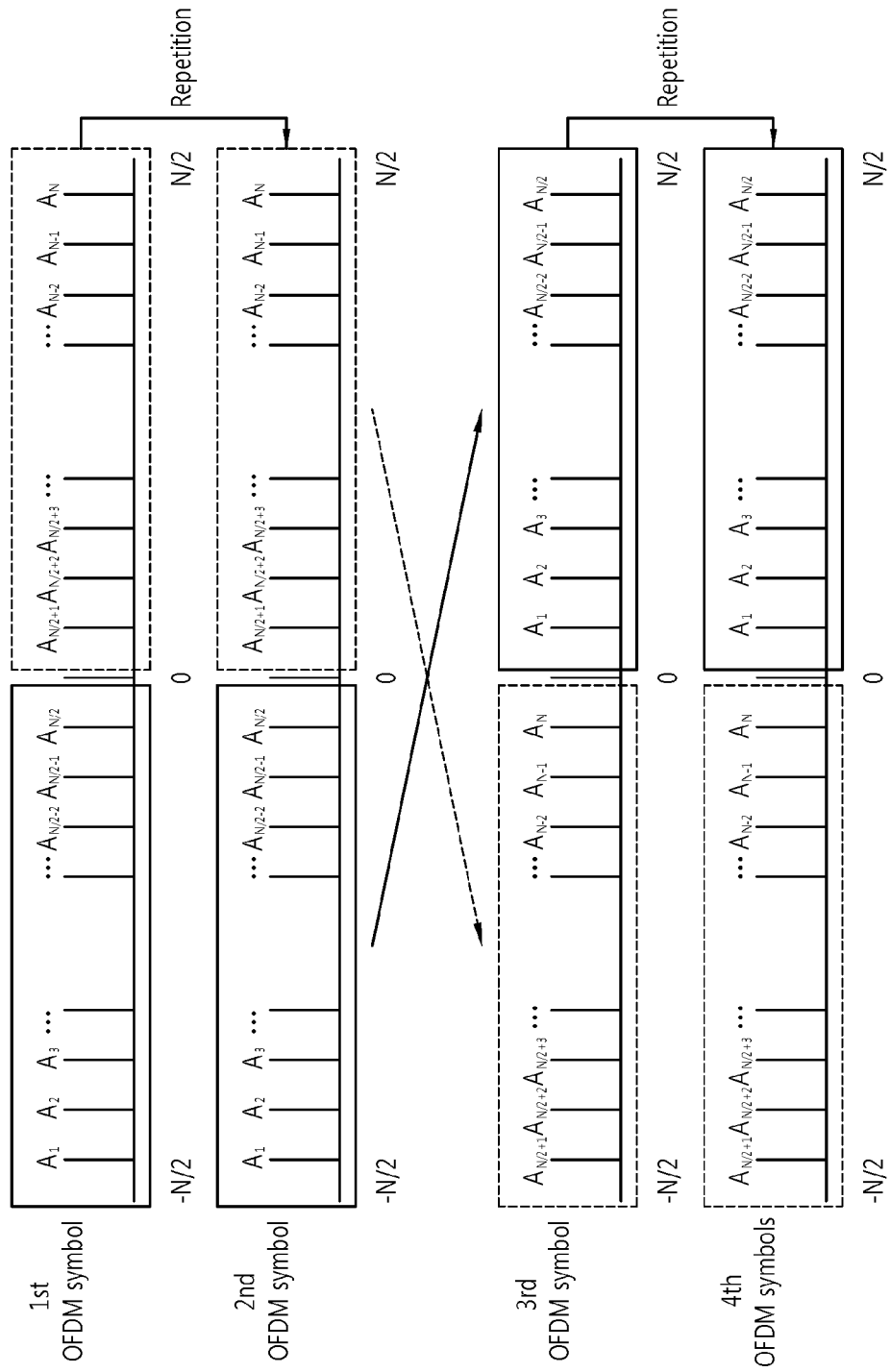
FIG. 3 is a diagram showing a structure of an OFDM symbol that may be used for transmission repeated four times according to an exemplary embodiment of the present invention.

FIG. 3 is a diagram showing a structure of an OFDM symbol that may be used for transmission repeated four times according to an exemplary embodiment of the present invention.

FIG. 3 shows that the transmission repeated four times may be implemented by coupling simple OFDM symbol repetition again transmitting the same OFDM symbol with the cyclic OFDM symbol repetition described with reference to FIG. 2.

A second OFDM symbol corresponds to the simple repetitions of a first OFDM symbol.

A third OFDM symbol corresponds to the one that the first OFDM symbol is repeated in the cyclic OFDM symbol. A fourth OFDM symbol corresponds to the one that the third OFDM symbol is simply repeated.

As shown in FIG. 3, the transmission repeated four times may further improve the receive sensitivity than the transmission repeated two times. Defining the OFDM symbol to be used at the time of performing the transmission repeated four times by dividing the subcarrier into four while cyclically changing the position thereof, as the diversity order is increased in the characteristics of the diversity gain, the added gain is gradually reduced. Therefore, a method for obtaining only power gain by applying the cyclic OFDM symbol repetition once and performing the remaining repetition as the simple repetition has been adopted. When the transmission repeated four times is implemented by the cyclic OFDM symbol repetition and the simple repetition, a cyclic prefix may be variously set, which can more increase efficiency.

FIG. 4 is a block diagram showing a frame format that may be applied to the repeat transmission according to the exemplary embodiment of the present invention.

Generally, when the OFDM method is applied, a protective period of the CP type is set so that a delay of a previous OFDM symbol does not affect the corresponding OFDM symbol. FIG. 4A shows an example of a general case, wherein the CP is added between the repetitively transmitted OFDM symbols.

FIG. 4B shows an example in which the CP is not added prior to the second OFDM symbol and the fourth OFDM symbol. Since the second OFDM symbol and the fourth OFDM symbol each have the same form as the first OFDM symbol and the fourth OFDM symbol, there is no inter-symbol interference even when the CP is not added, such that the performance deterioration may not occur. The transmission time can be saved by two CPs during the transmission of the four OFDM symbols, thereby improving throughput.

FIG. 4C shows a configuration of a frame in which the length of the CP added in front of the first and third OFDM symbols is extended twice. The reason of performing the repeat transmission is to extend the coverage. In this case, a delay spread of a channel is also increased, such that the length of the existing CP may be shorter than a maximum channel delay spread. Therefore, the extending the length of the CP twice may cover the extended channel delay spread due to the coverage extended. Even when the length of the CP is increased twice, the CP is not added to the second and fourth OFDM symbols, such that the length of the whole frame is equal to the frame of the format as shown in FIG. 4A. Therefore, it is possible to obtain an effect of covering the channel diffusion delay extended twice without degrading the throughput.

Hereinafter, in describing the frame format, a representation called a field as the component of the frame is used, but a component transmitted after being modulated may be represented as a symbol like a data symbol.

Figure 5:
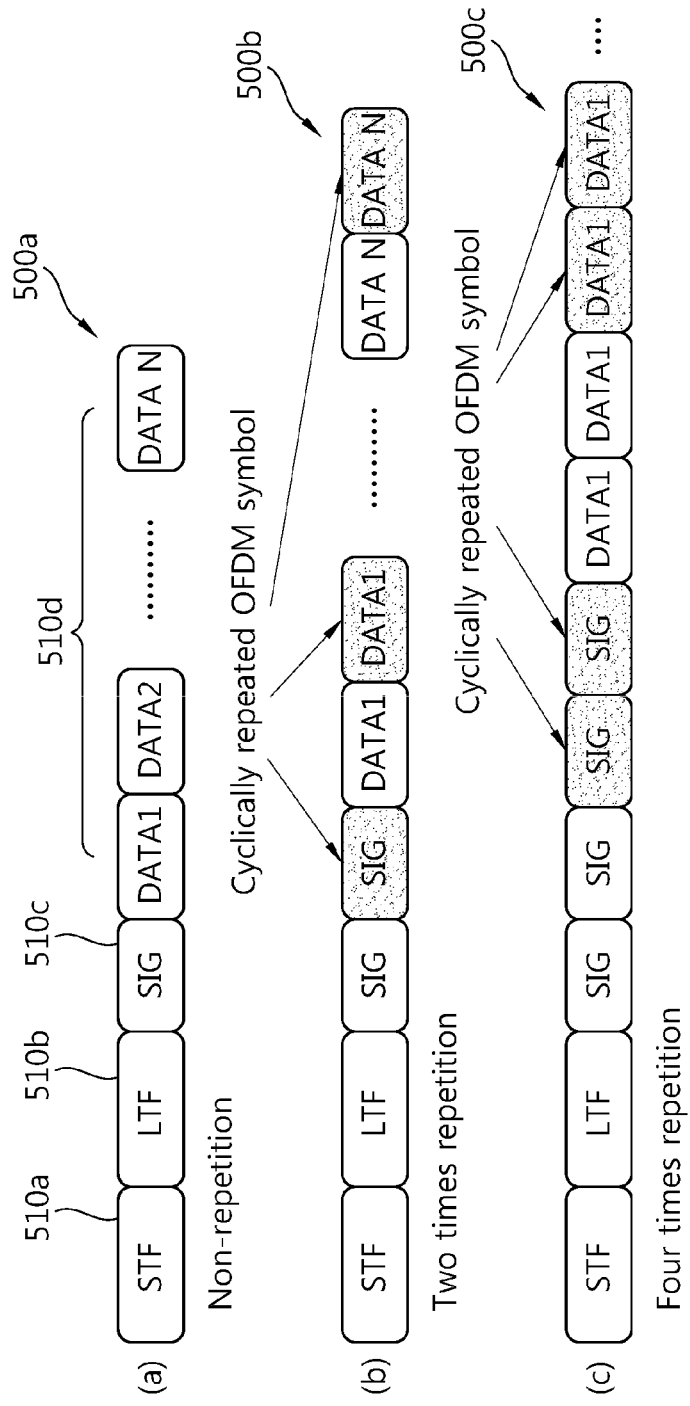
FIG. 5 is a diagram showing the frame format according to the exemplary embodiment of the present invention to which the repeat transmission is applied.

FIG. 5 is a diagram showing the frame format according to the exemplary embodiment of the present invention to which the repeat transmission is applied.

FIG. 5A shows a basic frame format of the WLAN system. Referring to FIG. 5A, a frame 500a includes a short training field (STF) 510a, a long training field 520a, a signal (SIG) field 530a, and a DATA field 540a. Each field other than the DATA field 540a is transmitted through one OFDM symbol. As shown, the DATA field 540a may be transmitted through at least one OFDM symbol.

The STF 510a may be used for signal sensing, automatic gain control (AGC), diversity selection, coarse frequency offset estimation, and timing synchronization. The LTF 520a may be used for channel estimation and fine frequency offset estimation. The SIG field 530a includes rate information as the control information and information indicating a length of a data unit included in the frame.

FIG. 5B shows the frame format used when the transmission repeated two times is applied. FIG. 5B shows a frame 500b in which the cyclic OFDM symbol repetition is applied to the SIG field and the data filed in a format as shown in FIG. 5A.

FIG. 5C shows a frame format used when the transmission repeated four times is applied. Referring to FIG. 5C, the frame 500c has a structure in which the SIG field and the data field are repeated four times, wherein two times uses the simple repetition and the remaining two times uses the cyclic OFDM symbol repetition. In this case, the CP structure of the SIG field and the DATA field to which the transmission repeated four times is applied may take three structures shown in FIG. 4. However, in the case of the SIG field, it may be preferable to have the structure in which the CP is added to each OFDM symbol. This structure is to automatically detect the repetition or not and the frequency through the constellation mapping. Hereinafter, this will be described in detail with reference to the drawings.

Figure 6:
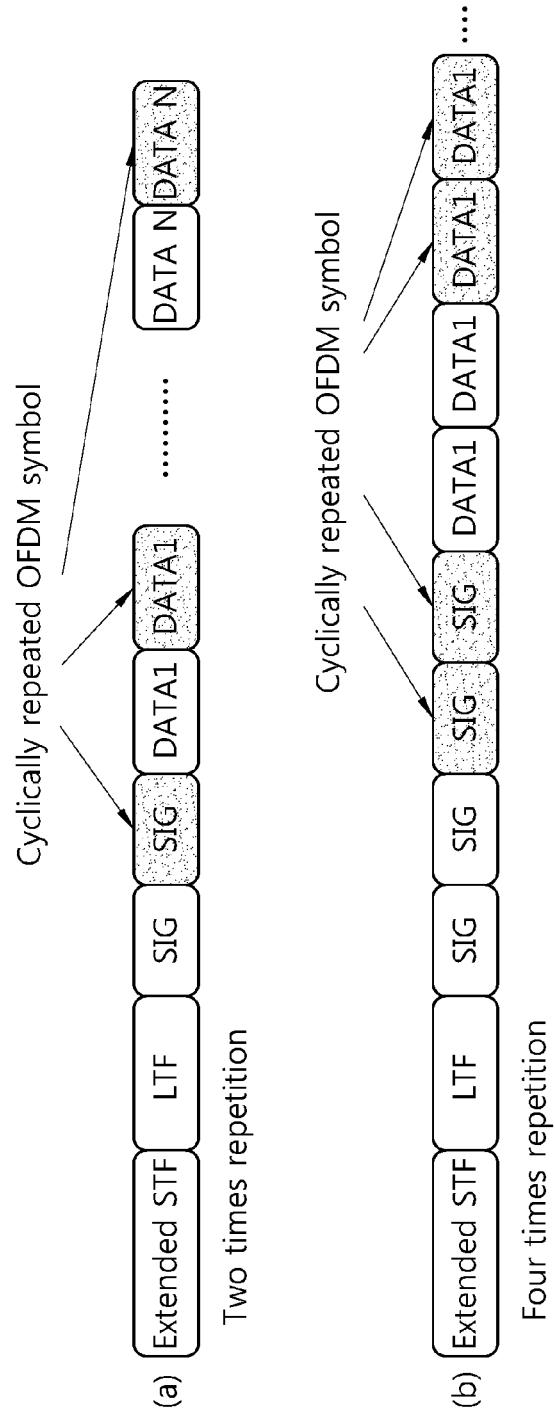
FIG. 6 is a diagram showing another example of the frame format according to the exemplary embodiment of the present invention.

FIG. 6 is a diagram showing another example of the frame format according to the exemplary embodiment of the present invention.

FIG. 6 is a diagram showing another example of the frame format according to the exemplary embodiment of the present invention.

When the transmission repeated two times or the transmission repeated four times is applied, the receive sensitivity is greatly improved, such that as the STF is short, the carrier sensing performance confirming the presence and absence of packets at a receiving end may be degraded. When the carrier sensing performance is degraded, there may be a case in which the packets are not received. Therefore, there is a need to extend the length of the STF so as to improve the carrier sensing performance. Referring to FIG. 6, it can be appreciated that the length of the SFT is extended in FIG. 6A showing the frame format at the time of the transmission repeated two times and in FIG. 6B showing the frame format at the time of the transmission repeated four times. When the WLAN system has a structure in which a given waveform is repeated ten-times, the extended SFT has a structure in which the same waveform is repeated ten-times or more. For example, when the STF is configured to have a total of 160 samples, which is a structure in which a waveform of 16 sample length is repeated ten-times, the extended STF means that a total number of samples may be 240, 320, or the like, by extending the waveform of 16 samples to a number larger than 10, that is, 15, 20, or the like. Even though the extension of LTF is not shown in FIG. 6, LTF can also be extended to improve the accuracy of channel estimation.

Meanwhile, a need exists for information capable of differentiating whether the receive STA is a frame transmitted without being repeated or a frame repeatedly transmitted two times or a frame repeatedly transmitted four times. To this end, a rate subfield and a reserved field of a signal field may be used.

Figure 7:
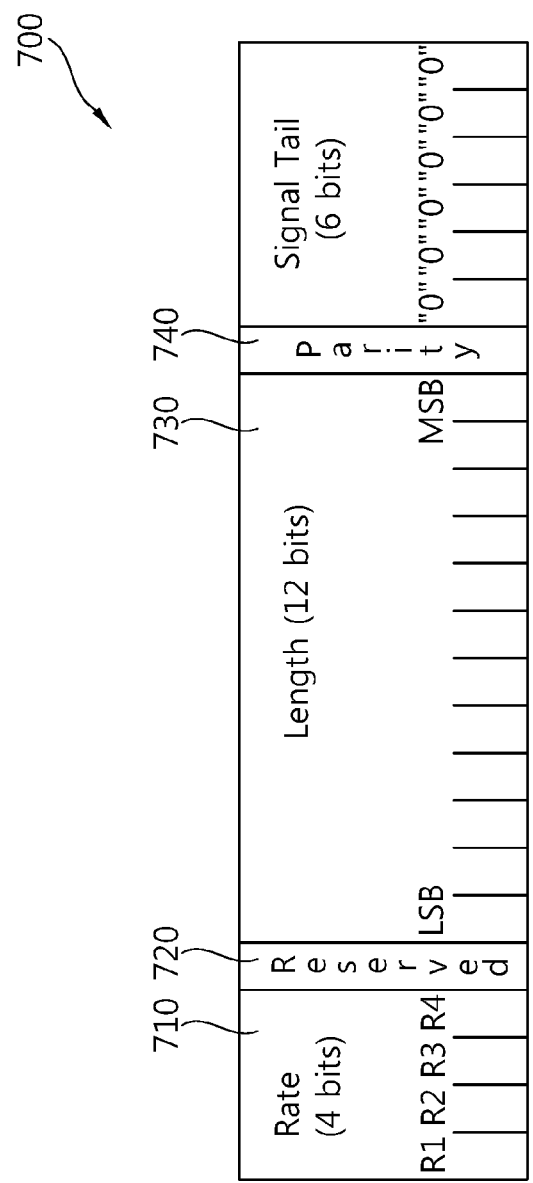
FIG. 7 is a diagram showing a format of a signal field according to the exemplary embodiment of the present invention.

FIG. 7 is a diagram showing a format of a signal field according to the exemplary embodiment of the present invention.

Referring to FIG. 7, a signal field 700 may include a rate subfield 710, a reserved bit 720, a length subfield 730, a parity bit 740, and a signal tail subfield 750. The length subfield 730 indicates a length of the data unit included in the frame. The parity bit 740 is a bit for parity check. The signal tail subfield 750 includes tail bits.

The rate subfield 710 may have a length of 4 bits and may indicate 16 modes. The existing rate subfield may define 8 data rates with four constellation mapping methods and three code rates. Therefore, the rate subfield 710 may be set to indicate eight rates in the condition in which there is no repeat transmission and eight rates in the condition in which the cyclic OFDM symbol repetition is applied.

FIG. 8 is a diagram showing a configuration of a rate subfield according to the exemplary embodiment of the present invention.

The configuration of the rate field indicating the eight rates when the repeated transmission is not applied and indicating the eight rates when the repeated transmission according to the cyclic OFDM symbol repetition is applied can be appreciated from FIG. 8. In this case, if a value of R4 that is a final fourth bit of the rate field is 0, it may be analyzed as indicating the rate when the repeat transmission is not applied is indicated and if a value of R4 that is a final fourth bit of the rate field is 1, the rate when the repeat transmission is applied Referring again to FIG. 7, the reserved bit 720 may be set to indicate whether it is the frame format according to the transmission repeated two times or the frame format according to the fourth-times repeat transmission. If 0, it may be set to indicate the frame format to which the simple repetition is not applied and if 1, the frame format according to the transmission repeated four times by applying the simple repetition thereto.

As described above, it is possible to differentiate when the repeat transmission is not performed, when the transmission repeated two times is performed, and when the transmission repeated four times is performed, by using the rate subfield 710 of 4 bits and the reserved bit 720 of 1 bit.

Meanwhile, a method for automatically detecting when the repeat transmission is applied, without allowing the receive STA to demodulate and analyze the signal field.

FIG. 9 is a diagram showing a constellation mapping method applied to the signal field according to the exemplary embodiment of the present invention. It can be implemented by applying BPSK modulation to the signal field for the first OFDM symbol and QBPSK modulation to the signal field for the remaining OFDM symbol.

FIG. 9A indicates the modulation method applied to the signal field when the repeat transmission is not applied. In this case, the signal field is not repeatedly transmitted and therefore, the signal field is applied with the BPSK modulation so as to be transmitted as the OFDM symbol.

FIG. 9B shows the modulation method applied to the signal fields when the transmission repeated two times is applied. In this case, the BPSK modulation is applied to the signal field to be first transmitted and the QBPSK modulation is applied to the signal field to be second transmitted.

FIG. 9C shows the modulation method applied to the signal fields when the transmission repeated four times is applied. In this case, the BPSK modulation is applied to the signal field to be first transmitted and the QBPSK modulation is applied to the remaining signal fields.

As shown in FIG. 9, all of the remaining OFDM symbols other than the OFDM symbol for the first signal field are transmitted in the state in which the QBPSK modulation is applied thereto and therefore, the receive STA can appreciate the repeated frequency by confirming only the modulation method without confirming the rate subfield and the value of the reserved bit included in the signal field. The receive STA can be appreciated that the repeat transmission is applied, when the BPSK modulation is applied to the first received OFDM symbol and the QBPSK modulation is applied to the next OFDM symbol. In addition, it can appreciate the two-times repetition or the four-times repetition according whether the QBPSK modulation is applied to the following transmitted OFDM symbol.

The above-mentioned repeat transmission method may also be applied to an HT WLAN system.

Figure 10:
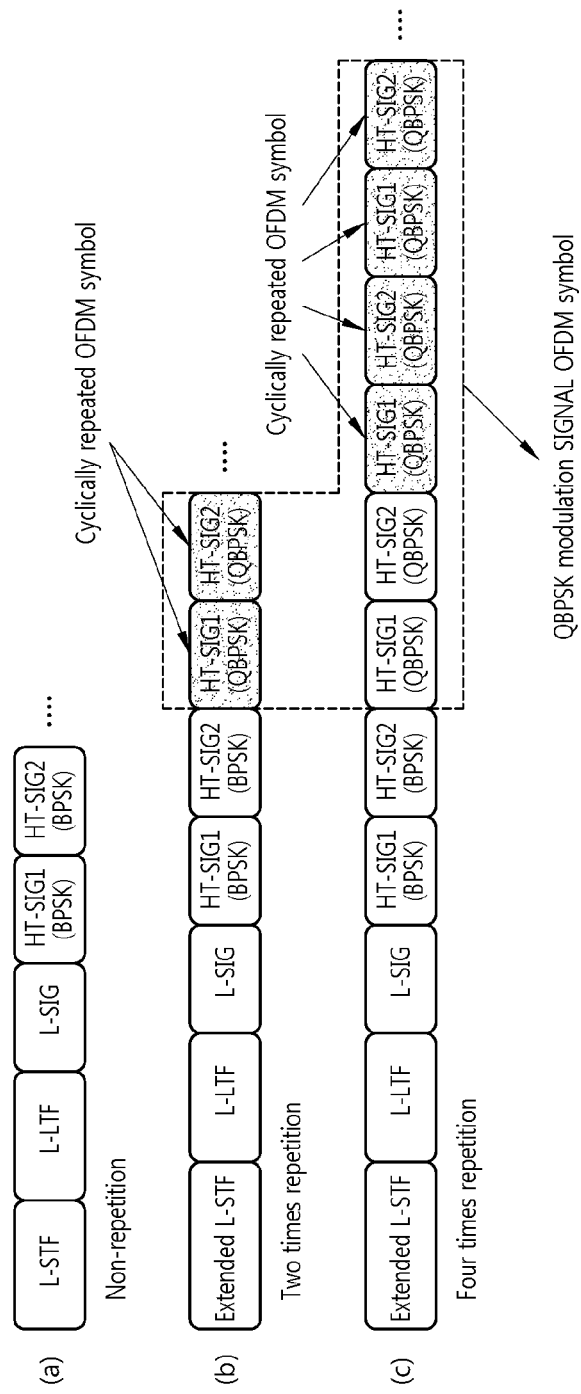
FIG. 10 is a diagram showing an example of an HT frame format according to the exemplary embodiment of the present invention.

FIG. 10 is a diagram showing an example of an HT frame format according to the exemplary embodiment of the present invention.

FIG. 10A shows the format of the existing HT frame. In the HT frame, an HT-signal (HT-SIG) field is transmitted through two OFDM symbols. Each HT-SIG field may be divided into an HT-SIG1 field and an HT-SIG2 field.

FIG. 10B shows the format of the HT frame when the transmission repeated two times is applied. In this case, the HT-SIG1 field and the HT-SIG2 field may be considered as a single unit and therefore, the cyclic OFDM symbol repetition may be applied. Therefore, the HT-SIG1 field and the HT-SIG2 field to which the cyclic OFDM symbol repetition is applied may be further included.

The information allowing the receive STA to indicate whether the transmitted frame is a frame to which the repeat transmission is applied may be included in the HT-SIG field. To this end, it can be indicated whether no repetition, transmission repeated two times, and transmission repeated four times are applied by setting the subfield of the HT-SIG field, having a size of 7 bits and defining a modulation and coding scheme (MCS), and the reserved bit having a size of 1 bit.

Further, another modulation method may be applied to allow the receive STA to appreciate whether the repeat transmission is applied only by the constellation mapping state prior to the demodulation and analysis of the HT-SIG field. The first transmitted HT-SIG1 and HT-SIG2 fields is applied with the BPSK modulation and is then transmitted as the OFDM symbol and the second transmitted HT-SIGA1 and HT-SIG2 fields may be applied with the QBPSK modulation so as to be transmitted.

In addition, in order to improve the carrier sensing performance, the length of the L-STF may be extended.

FIG. 10C shows the format of the HT frame when the transmission repeated two times is applied. In this case, it may include the HT-SIG1 field and the HT-SIG2 field simply repeated and include two fields such as the HT-SIG1 field and the HT-SIG2 field to which the cyclic OFDM symbol repetition is applied.

Similar to FIG. 10B, the HT-SIG field may include the MCS subfield and the reserved bit that are set to indicate whether the repeat transmission is applied.

The first transmitted HT-SIG1 field and HT-SIG2 field may be applied with the BPSK modulation and are transmitted as the OFDM symbol and the following transmitted field may be applied with the QBPSK modulation so as to be transmitted.

In order to improve the carrier sensing performance, the length of the L-STF may be extended.

Figure 11:
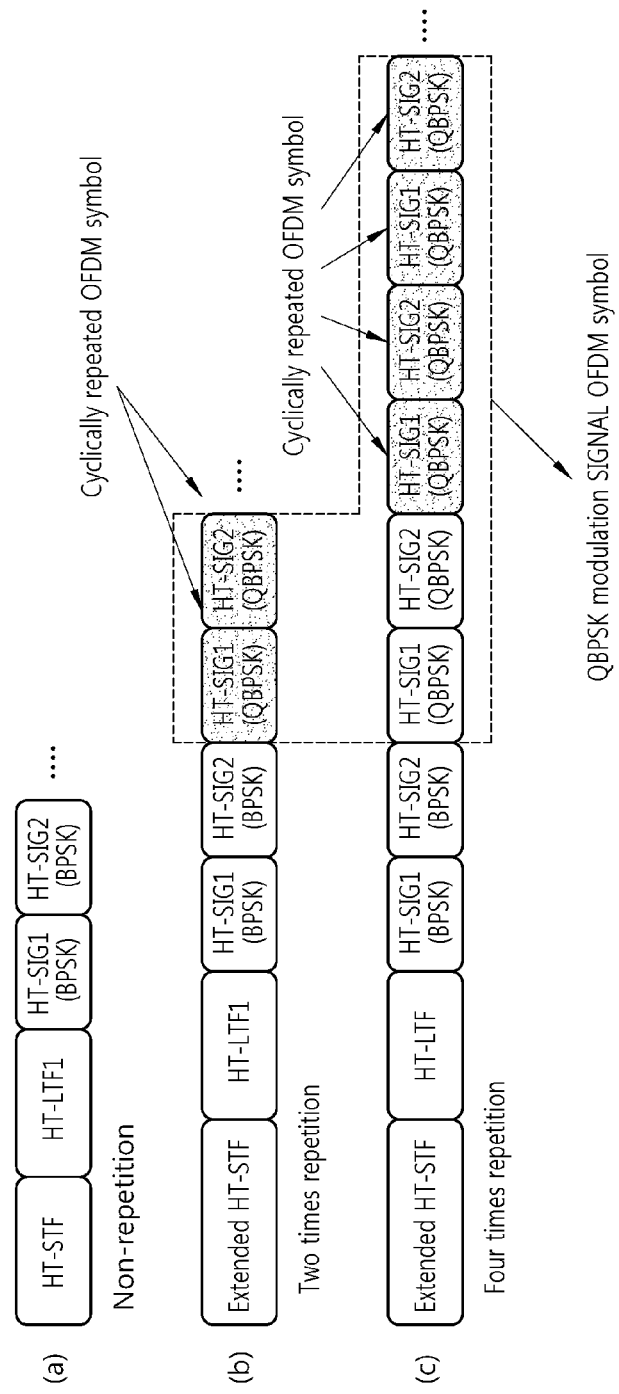
FIG. 11 is a diagram showing another example of the HT frame format according to the exemplary embodiment of the present invention.

FIG. 11 is a diagram showing another example of the HT frame format according to the exemplary embodiment of the present invention. FIG. 11 shows an HT-green frame that may be used in the HT WLAN system configured of only the STA supporting the HT.

Even in the frame format of FIG. 11, similar to FIG. 10, the HT-SIG1 field and the HT-SIG2 field may be repeatedly included. The HT-SIG field may include the MCS subfield and the reserved bit that are set to indicate whether the repeat transmission is applied.

In addition, the first transmitted HT-SIG1 field and HT-SIG2 field may be applied with the BPSK modulation and then, the simply repeated field and the cyclic OFDM symbol repeated field may be applied with the QBPSK modulation so as to be transmitted.

Figure 12:
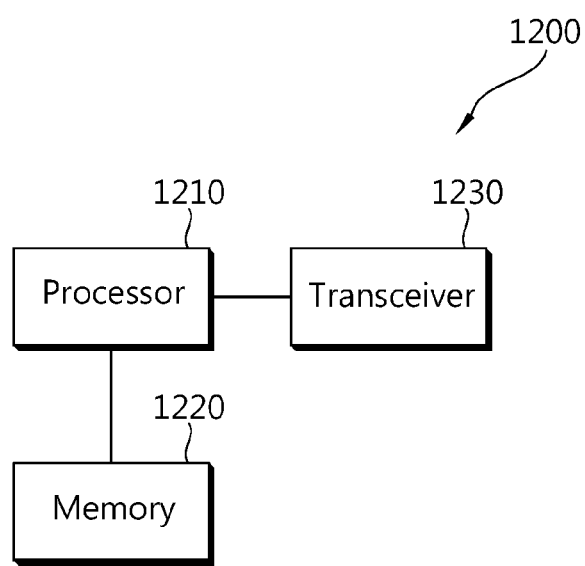
FIG. 12 is a block diagram showing a wireless device in which the exemplary embodiment of the present invention may be implemented.

Though extensions of L-LTF and HT-LTF FIG. 11 are not shown in the FIGS. 11 and 12, it can also be considered for more accurate channel estimation in FIGS. 11 and 12.

FIG. 12 is a block diagram showing a wireless device in which the exemplary embodiment of the present invention may be implemented. The wireless device as shown in FIG. 12 may be the AP or the STA.

Referring to FIG. 12, a wireless device 1200 includes a processor 1210, a memory 1220, and a transceiver 1230. The transceiver 1230 transmits and/or receives the wireless signal but implements the physical layer of IEEE 802.11. The processor 1210 is functionally connected with a transceiver 930 and may be set to implement the exemplary embodiment of the present invention shown in FIGS. 1 to 11.

The processor 1210 and/or the transceiver 1230 may include an application-specific integrated circuit (ASIC), other chipsets, logical circuits, and/or data processing devices. When the exemplary embodiments of the present invention are implemented by software, the above-mentioned methods may be implemented by a module (process, function, or the like) performing the above-mentioned functions. The module is stored in the memory 1220 and may be executed by the processor 1210. The memory 1220 may be included inside the processor 1210 and may be separately disposed outside the processor and be functionally connected to the processor 1210 by widely known various units.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. The exemplary embodiments should be understood to be only technical ideas rather than to be limited thereto. Therefore, the scope of the present invention is not limited to the specific embodiments but is determined by the scope of the invention. Accordingly, such modifications, additions and substitutions should also be understood to fall within the scope of the present invention.

The exemplary embodiments of the present invention propose the repeat transmission method for improving the receive sensitivity of the WLAN system and the methods for improving the frame structure and performance for supporting the same based on the WLAN standard. When the methods are supported, the data transmission rate can be reduced but the service coverage of the WLAN system can be extended. Therefore, the exemplary embodiments of the present invention can effectively provide the service at higher reliability in applications such as the sensor network, or the like, requiring the wider coverage rather than the high transmission rate.

What is claimed is:

1. A method for transmitting a frame by a transmit station (STA) in a wireless local area network system, the method comprising:
   transmitting a short training symbol for coarse frequency offset estimation and timing synchronization, to a receive STA;
   transmitting a long training symbol for fine frequency offset estimation and channel estimation, to the receive STA;
   transmitting a first signal symbol including control information to the receive STA;
   transmitting a second signal symbol including the control information to the receive STA;
   transmitting a first data symbol to the receive STA; and
   transmitting a second data symbol to the receive STA,
   wherein the second signal symbol is a cyclic repeat symbol including subcarriers determined based on subcarriers of the first signal symbol, a position of the subcarriers of the second signal symbol being determined by a changed position of the subcarriers of the first signal symbol based on a subcarrier index 0.

2. The method of claim 1, wherein the first signal symbol and the second signal symbol are each an orthogonal frequency division multiplexing (OFDM) symbol.

3. The method of claim 2, wherein the second data symbol is a cyclic OFDM repeat symbol including subcarriers determined based on subcarriers of the first data symbol, a position of the subcarriers of the second data symbol being determined by a changed position of the subcarriers of the first data symbol based on the subcarrier index 0.

4. The method of claim 3, wherein the first signal symbol is applied with binary phase shift keying (BPSK) modulation.

5. The method of claim 4, wherein the second signal symbol is applied with quadrature binary phase shift keying (QBPSK) modulation.

6. The method of claim 5, wherein the control information includes information indicating that the first signal symbol and the second signal symbol are transmitted.

7. The method of claim 3, further comprising:
   transmitting a third signal symbol, the third signal symbol being same as the first signal symbol; and
   transmitting a fourth signal symbol, the fourth signal symbol being same as the second signal symbol.

8. The method of claim 7, further comprising:
   transmitting a third data symbol, the third data symbol being same as the first data symbol; and
   transmitting a fourth data symbol, the fourth data symbol being same as the second data symbol.

9. The method of claim 8, wherein the third signal symbol is transmitted between the first signal symbol and the second signal symbol.

10. The method of claim 9, wherein the fourth signal symbol is transmitted following the second signal symbol.

11. The method of claim 10, wherein the first signal symbol is applied with BPSK modulation.

12. The method of claim 11, wherein the second signal symbol, the third signal symbol, and the fourth signal symbol are applied with QBPSK modulation.

13. The method of claim 12, wherein the control information includes information indicating that the first signal symbol, the second signal symbol, the third signal symbol, and the fourth signal symbol are transmitted.

14. The method of claim 10, further comprising:
   transmitting a plurality of cyclic prefixes (CPs) for protecting each symbol from a delay spread.

15. The method of claim 14,
   wherein a cyclic prefix precedes a corresponding one of the first signal symbol, the second signal symbol, the first data symbol, and the second data symbol.

16. The method of claim 15,
   wherein a cyclic prefix precedes a corresponding one of the third signal symbol, the fourth signal symbol, the third data symbol, and the fourth data symbol.

17. The method of claim 1, wherein the subcarriers of the second signal symbol are determined by an inversion of the position of the subcarriers of the first signal symbol based on the subcarrier index 0.

18. The method of claim 1,
   wherein a length of the short training symbol is extended for improving the coarse frequency offset estimation and the timing synchronization.

19. The method of claim 18,
   wherein a length of the long training symbol is extended for improving the fine frequency offset estimation and the channel estimation.

20. A wireless device, comprising:
   a transceiver configured to transmit and receive a wireless signal; and
   a processor configured to be functionally coupled with the transceiver, wherein the processor configured to:
   transmit a short training symbol for coarse frequency offset estimation and timing synchronization to a receive device;
   transmit a long training symbol for fine frequency offset estimation and channel estimation to the receive device;

transmit a first signal symbol including control information to the receive device;
transmit a second signal symbol including the control information to the receive device;
transmit a first data symbol to the receive device; and
transmit a second data symbol to the receive device,
wherein the second signal symbol is a cyclic repeat symbol including subcarriers determined based on subcarriers of the first signal symbol, a position of the subcarriers of the second signal symbol being determined by a changed position of the subcarriers of the first signal symbol based on a subcarrier index 0.

21. The wireless device of claim 20, wherein the first signal symbol and the second signal symbol are each an orthogonal frequency division multiplexing (OFDM) symbol.

22. The wireless device of claim 20, wherein the subcarriers of the second signal symbol are determined by an inversion of the position of the subcarriers of the first signal symbol based on subcarrier index 0.

23. A method for receiving a frame by a receive station (STA) in a wireless system, the method comprising:
receiving a short training symbol for coarse frequency offset estimation and timing synchronization from a transmit STA;
receiving a long training symbol for fine frequency offset estimation and channel estimation from the transmit STA;
receiving a first signal symbol including control information from the transmit STA;
receiving a second signal symbol including the control information from the transmit STA;
receiving a first data symbol from the transmit STA; and
receiving a second data symbol from the transmit STA,
wherein the second signal symbol is a cyclic repeat symbol including subcarriers determined based on subcarriers of the first signal symbol, a position of the subcarriers of the second signal symbol being determined by a changed position of the subcarriers of the first signal symbol based on a subcarrier index 0.

24. The method of claim 23, wherein the first signal symbol and the second signal symbol are each an orthogonal frequency division multiplexing (OFDM) symbol.

25. The method of claim 23, wherein the subcarriers of the second signal symbol are determined by an inversion of the position of the subcarriers of the first signal symbol based on subcarrier index 0.

* * * * *